United States Patent
Nussbaum et al.

(10) Patent No.: US 7,353,342 B1
(45) Date of Patent: Apr. 1, 2008

(54) SHARED LEASE INSTRUCTION SUPPORT FOR TRANSIENT BLOCKING SYNCHRONIZATION

(75) Inventors: Daniel S. Nussbaum, Cambridge, MA (US); Mark S. Moir, Hampton, NH (US); Nir N. Shavit, Cambridge, MA (US); Guy L. Steele, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 368 days.

(21) Appl. No.: 11/078,117

(22) Filed: Mar. 11, 2005

Related U.S. Application Data

(63) Continuation-in-part of application No. 10/918,062, filed on Aug. 13, 2004.

(51) Int. Cl.
*G06F 12/00* (2006.01)

(52) U.S. Cl. .................. 711/147; 711/152; 711/154

(58) Field of Classification Search .............. 711/154
See application file for complete search history.

(56) References Cited

U.S. PATENT DOCUMENTS

| | | | |
|---|---|---|---|
| 4,561,051 A | 12/1985 | Rodman et al. | |
| 4,858,116 A | 8/1989 | Gillet et al. | |
| 5,301,290 A * | 4/1994 | Tetzlaff et al. | 711/142 |
| 5,428,761 A | 6/1995 | Herlihy et al. | |
| 5,875,342 A * | 2/1999 | Temple | 710/260 |
| 5,892,955 A | 4/1999 | Ofer | |
| 5,991,845 A | 11/1999 | Bohannon et al. | |
| 6,370,625 B1 | 4/2002 | Carmean et al. | |
| 6,745,274 B1 | 6/2004 | Snyder et al. | |
| 6,782,452 B2 | 8/2004 | Williams, III | |
| 6,958,507 B2 | 10/2005 | Atwood et al. | |
| 2002/0078307 A1 | 6/2002 | Zahir | |
| 2004/0015642 A1 | 1/2004 | Moir et al. | |
| 2005/0038964 A1 | 2/2005 | Hooper et al. | |
| 2006/0036850 A1 | 2/2006 | Enokida | |

OTHER PUBLICATIONS

Murice Herlihy, A Methodology for Implementing Highly Concurrent Data Objects, ACM Transactions on Programming Languages and Systems, vol. 15, No. 5, Nov. 1993, pp. 745-770.

Nir Shavit, et al., Elimination Trees and The Contruction of Pools and Stacks, 7th Annual Symposium on Parallel Algorithms and Architectures (SPAA), 30 pages.

Thomas E. Anderson, The Performance of Spin Lock Alternatives for Shared-Memory Multiprocessors, IEEE Transactions on Parallel and Distributed Systems, vol. 1, No. 1, Jan. 1990, pp. 6-16.

Maged M. Michael. Safe Memory Reclamation for Dynamic Lock-Free Objects Using Atomic Reads and Writes. PODC 2002 Jul. 21-24, 2002.

(Continued)

*Primary Examiner*—Gary Portka
*Assistant Examiner*—Shawn Eland
(74) *Attorney, Agent, or Firm*—Osha·Liang LLP

(57) ABSTRACT

A computer system implementing transient blocking synchronization allows a memory location leased by a first process to be read-accessible to another process. In other words, more than one thread may have read-only type leases on a given memory location at a given time. Such "shared" leases expire when respective lease periods of the shared leases elapse.

3 Claims, 1 Drawing Sheet

OTHER PUBLICATIONS

John M. Mellor-Crummey, et al. Algorithms for Scalable Synchronization on Shared-Memory Multiprocessors. ACM Transactions on Computer Systems, vol. 9, No. 1, Feb. 1991, pp. 21-65.

Maged M. Michael, et al. Nonblocking Algorithms and Preemption-Safe Locking on Multiprogrammed Shred Memory Multiprocessors. Journal of Prallel and Distributed Computing 51, Article No. PC981446, 1998, pp. 1-26.

Maurice P. Herlihy, et al. Linearizability: A Correctness Condition for Concurrent Objects. ACM Transactions on programming Languages and Systems, vol. 12, No. 3, Jul. 1990, pp. 463-492.

Maurice Herlihy, et al. The Repeat Offender Problem: A Mechanism for Supporting Dynamic-Sized Lock-Free Data Structures. 15 pages.

Murice Herlihy, et al. Scalable Concurrent Counting. In the Proceedings of the 3rd Annual ACM Symposium on Parallel Algorithms and Architectures, Jul. 1992, pp. 1-31.

Nir Shavit, et al. A Steady State Analysis of Diffracting Trees. pp. 1-26.

Nir Shavit, et al. Diffracting Trees. In the Proceedings of the Annual Symposium on Parallel Algorithms and Architectures (SPAA), Jun. 1994, pp. 0-49.

Nir Shavit, et al. Combining Funnels: A Dynamic Approach To Software Combining. Principals of Distributed Computing (PODC98). pp. 1-30.

Beng-Hong Lim, et al. Waiting Algorithms for Synchronization in Large-Scale Multiprocessors. ACM Transactions on Computer Systems, vol. 11, No. 3, Aug. 1993, pp. 1-39.

Maged M. Michael, et al. Simple, Fast, adn Practical Non-Blocking and Blocking Concurrent Queue Algorithms. 8 pages.

Ravi Rajwar, et al. Speculative Lock Elision: Enabling Highly Concurrent Multithreaded Execution. In the proceedings of the 34th International Symposium on Microarchitechture (MICRO), Dec. 3-5, 2001, 12 pages.

John D. Valois. Implementing Lock-Free Queues. In proceedings of the Seventh International Conference on Parallel and Distributed Computing Systems, Las Vegas, NV, Oct. 1994, pp. 1-9.

Sundeep Prakash, et al. Non-Blocking Algorithms for Concurrent Data Structures. pp. 1-40.

John M. Mellor-Crummey, et al. Algorithms for Scalable Synchronization on Shared-Memory Multiprocessors. Jan. 1991, 42 pages.

Peter Magnusson, et al. Queue Locks on Cache Coherent Multiprocessors.7 pages.

Travis S. Craig. Building FIFO and Priority-Queuing Spin Locks from Atomic Swap. pp. 1-29.

Yehuda Afek, et al. Atomic Snapshots of Shred Memory. pp. 1-21. A Preliminary version of this paper appeared In the *Proceedings of the 9th Annual ACM Symposium on Principles of Distributed Computing*, (Quebec City, Quebec, August) ACM, New York, 1990, pp. 1-14.

Ole Agesen, et al. DCAS-Based Concurrent Deques. 10 pages.

Maurice Herlihy. Wait-Free Synchronization. ACM Transactions on Programming Languages and Systems, vol. 11, No. 1, Jan. 1991, pp. 124-149.

Mark Moir. Practical Implementations of Non- Blocking Synchronization Primitives. 10 pages.

Maurice Herlihy, et al. Obstruction-Free Synchronization: Double-Ended Queues as an Example. 8 pages.

Gray, et al; "Leases: An Efficient Fault-Tolerant Mechanism for Distributed File Cache Consistency"; ACM, pp. 202-204, 1989.

\* cited by examiner

SHARED LEASE INSTRUCTION SUPPORT FOR TRANSIENT BLOCKING SYNCHRONIZATION

CROSS-REFERENCE TO RELATED APPLICATIONS

This application is a continuation-in-part of U.S. patent application Ser. No. 10/918,062, entitled "Computer System and Method for Leasing Memory Location to Allow Predictable Access to Memory Location" and filed on Aug. 13, 2004, and hereby incorporates by reference the entirety of that application. Further, this application cross-references U.S. patent application Ser. No. 11/078,120, entitled "Exclusive Lease Instruction Support for Transient Blocking Synchronization" and filed on Mar. 11, 2005, and hereby incorporates by reference the entirety of that application.

STATEMENT REGARDING FEDERALLY SPONSORED RESEARCH OR DEVELOPMENT

The present invention was made with the support of the government of the United States under contract NBCH020055 awarded by the Defense Advanced Research Projects Administration. The United States government may have certain rights in the present invention.

BACKGROUND

A modern computer system has at least a microprocessor and some form of memory. Generally, the processor retrieves data stored in the memory, processes/uses the retrieved data to obtain a result, and stores the result in the memory.

An important consideration in multiprocessor system design involves the potential of two or more processors attempting to access and/or store data in the same memory location at the same time. Thus, designers have implemented, using both software and/or hardware, various "synchronization" techniques to address the issue of threads (i.e., sequences of instructions being processed by a processor) concurrently attempting to access the same memory location.

Synchronization can be implemented by a processor "blocking" other processors from accessing or storing data to a particular memory location, i.e., a processor maintains exclusive, uninterruptible ownership of a particular memory location. However, maintaining exclusive ownership of a memory location may produce a high number of failures and/or deadlocks, particularly for large-scale multiprocessor systems (e.g., systems having thousands of processors running in parallel). Such large-scale multiprocessor systems tend to require higher levels of robustness and tolerance than that provided by blocking synchronization techniques due to increased delays and fluctuations in communication time and the effects of fast context switching typical of large-scale multiprocessor systems.

At least partly in order to address the drawbacks of blocking synchronization techniques, "non-blocking" synchronization techniques have emerged that allow multiple processors to access concurrent objects in a non-mutually exclusive manner to meet the increased performance requirements of large-scale multiprocessor systems. Non-blocking synchronization may be implemented through hardware and software components in a variety of ways. For example, in a multiprocessor system, a combination of instruction primitives and registers is used to achieve non-blocking synchronization in a multiprocessor system.

In one manner, a processor sends a Load-Linked request to a controller to load a value from a memory location, which, in turn, sets a bit associated with the memory location. The bit is cleared when a Store-Conditional operation executed by any processor in the system is performed on the memory location. Once the value has been successfully loaded, the processor executes one or more instructions to manipulate the loaded value. The processor then issues a Store-Conditional request that attempts to store the manipulated value back to the memory location. However, the value is only stored to that memory location if the associated bit in the controller has not been unset (i.e., if no other processor has written to the memory location since the Load-Linked request). If the Store-Conditional request succeeds, this indicates that all three steps (i.e., the Load-Linked operation, the loaded value manipulation, and the Store-Conditional operation) occurred atomically (i.e., as a single, uninterrupted sequence). On the other hand, if the Store-Conditional request fails, the data is not stored in that memory location. In this case, the instruction sequence including the Store-Conditional/Load-Linked instruction pair may be said to have "failed." When this happens, the system may retry that instruction sequence.

The implementation of the Load-Linked/Store-Conditional primitives in non-blocking synchronization has two distinct features. First, all Load-Linked requests are required to succeed. Secondly, all Load-Linked requests require some sort of recording (or tracking) by hardware.

Recording Load-Linked requests may require that a controller notify all processors that initiated Load-Linked requests whenever a Store-Conditional request invalidates them, essentially mimicking a cache coherence protocol. Alternatively, a record may be maintained in each controller for every initiated Load-Linked request. In this case, the Load-Linked request is only removed from the record of the controller once a successful Store-Conditional request occurs. Because the completion of a Store-Conditional request cannot be forecasted, the latter option requires support for lists of unbounded size, which complicates controller design.

Another type of non-blocking synchronization technique involves the use of Compare&Swap primitives. A Compare&Swap operation typically accepts three values, or quantities: a memory address A, a comparison value C, and a new value N. The operation fetches and examines the contents V of memory at address A. If those contents V are equal to C, then N is stored into the memory location at address A, replacing V. A boolean return value indicates whether the replacement occurred. Depending on whether V matches C, V is returned or saved in a register for later inspection (possibly replacing either C or N depending on the implementation).

The Load-Linked/Store-Conditional and Compare&Swap operations described above are examples of instructions that can be used as building blocks for optimistic non-blocking synchronization schemes. Typical optimistic non-blocking synchronization schemes do not hold ownership and must optimistically check to make sure they were not interrupted, thereby possibly introducing implementation and user-level problems that require costly solutions and/or weakened semantics. Further, these non-blocking synchronization implementations put the burden of coordination on the threads and are typically incompatible with fast context-switching, which is an important technology often used to hide memory access latencies in large-scale multiprocessor systems.

SUMMARY

According to one aspect of one or more embodiments of the present invention, a computer system comprises: at least one processor; and a memory operatively connected to the at least one processor and having a plurality of memory locations shared by a plurality of processes, where the memory comprises instructions to obtain transient read-only access to one of the plurality of memory locations by one of the plurality of processes, where the one of the plurality of memory locations is read-only accessible to at least one other of the plurality of processes while a read-only access is pending on the one of the plurality of memory locations.

According to another aspect of one or more embodiments of the present invention, a computer system comprises: a first processor capable of concurrently executing a plurality of processes; and a plurality of memory locations shared by the plurality of processes, where, in response to a request by one of the plurality of processes, (i) at least one of the plurality of memory locations is transiently restricted from being accessed by another one of the plurality of processes, and (ii) at least one other of the plurality of memory locations is rendered read-only accessible to the one of the plurality of processes and the another one of the plurality of processes.

According to another aspect of one or more embodiments of the present invention, a method of performing computer system operations comprises: obtaining a transient lease on a first memory location of a transaction in a shared-memory multiprocessor computer system, where the first memory location is not accessible to another transaction during the pendency of the transient lease on the first memory location; and obtaining a transient lease on a second memory location of the transaction, where the second memory location is read-only accessible to another transaction during the pendency of the transient lease on the second memory location.

According to another aspect of one or more embodiments of the present invention, a shared-memory multiprocessor computer system comprises instructions to: obtain a transient lease on a first memory location of a transaction, where the first memory location is not accessible to another transaction during the pendency of the transient lease on the first memory location; and obtain a transient lease on a second memory location of the transaction, where the second memory location is read-only accessible to another transaction during the pendency of the transient lease on the second memory location.

According to another aspect of one or more embodiments of the present invention, a computer system comprises: at least one processor; a memory connected to the at least one processor and having a plurality of memory locations shared by a plurality of processes; and a controller configured to, in response to a request by one of the plurality of processes to perform synchronization operations on the plurality of memory locations, (i) transiently restrict at least one of the plurality of memory locations from being accessed by another one of the plurality of processes, and (ii) render as read-only accessible at least one other of the plurality of memory locations to the one of the plurality of processes and the another of the plurality of processes.

According to another aspect of one or more embodiments of the present invention, a computer system comprises: at least one processor; a memory operatively connected to the processor and accessible by a plurality of processes; and instructions to (i) obtain an exclusive lease on a first memory location in response to an associated request by one of the plurality of processes, and (ii) obtain a shared lease on a second memory location, where, during pendency of the shared lease, the second memory location is accessible to the one of the plurality of processes and another one of the plurality of processes.

Other aspects of the invention will be apparent from the following description and the appended claims.

DETAILED DESCRIPTION

Figure 1:
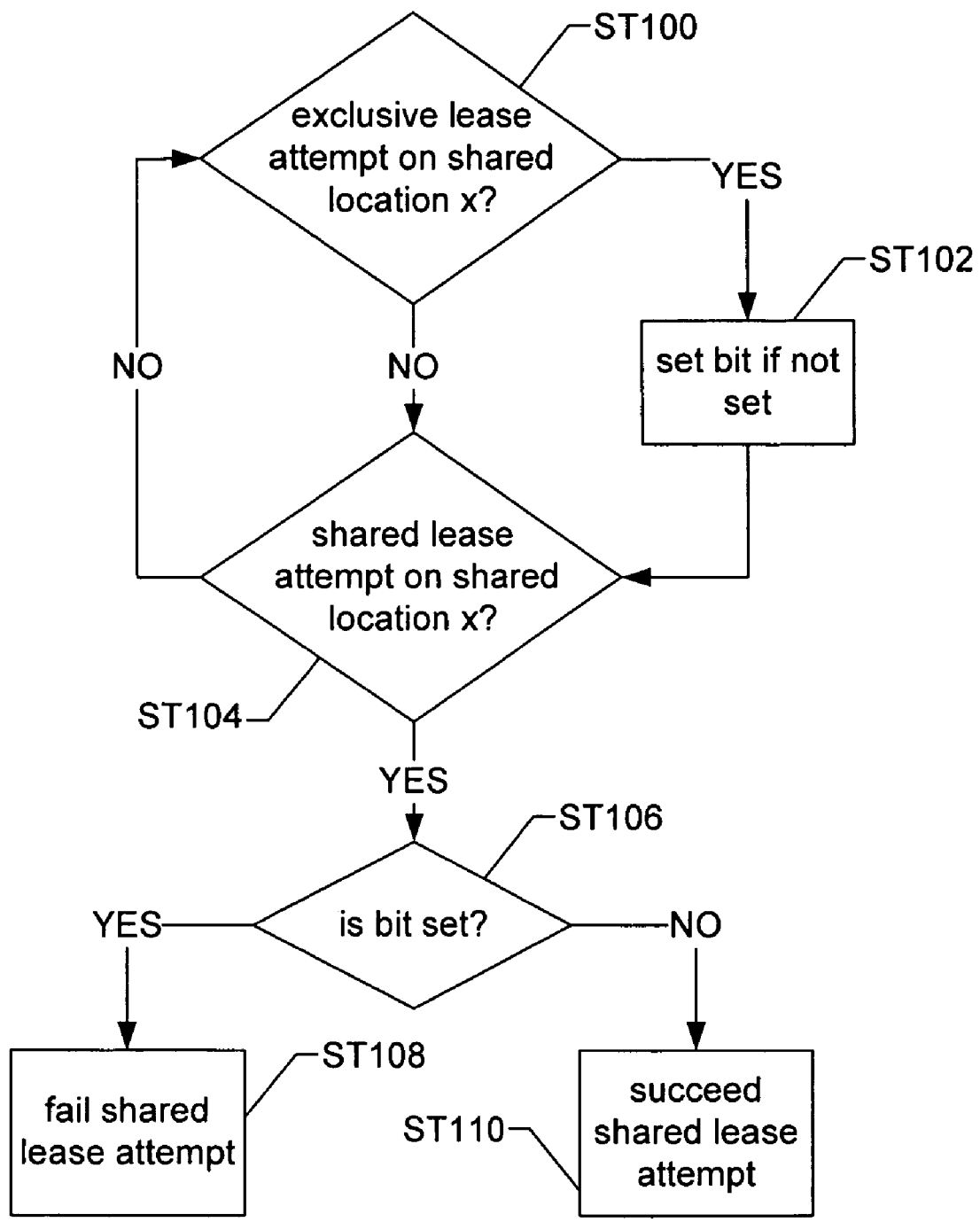
FIG. 1 shows a flow process in accordance with an embodiment of the present invention.

In addition to the Load&Lease, Store&Unlease, and other instructions described in U.S. patent application Ser. No. 10/918,062 referenced above, embodiments of the present invention relate to further instruction support for the implementation and use of transient blocking synchronization.

In transient blocking synchronization, an exclusive lease on a memory location is essentially a "lock" on the memory location that expires after a particular amount of time if not explicitly "unlocked" prior to the expiration of the particular amount of time. At any time, at most one thread may have an exclusive lease on a memory location, and only that thread may write to that memory location during the pendency of the exclusive lease. Because an exclusive lease on a memory location exists for a limited amount of time, the exclusive lease or "lock" is referred to as being "transient."

One type of exclusive lease instruction in transient blocking synchronization is the Load&Lease instruction described in U.S. patent application Ser. No. 10/918,062 referenced above. Another type of exclusive lease instruction that may be used to support transient blocking synchronization is a Load&Lease-Gated instruction described in U.S. patent application Ser. No. 11/078,120, entitled "Exclusive Lease Instruction Support for Transient Blocking Synchronization."

In addition to such exclusive lease instructions, transient blocking synchronization may be further supported with the use of "shared" lease instructions. Because it is common for threads running in parallel to use the same variables for computations, threads frequently desire read access, yet infrequently desire write access, to shared memory locations. At least partly in order to achieve increased parallelism by not leasing a memory location exclusively when write access to that memory location is not necessary, a Load&Lease-Shared instruction may be used to acquire a shared lease on a memory location, so as to allow other transactions to read from the memory location if and when necessary.

In one or more embodiments of the present invention, any number of transactions may hold a shared lease on a memory location at the same time as long as a shared lease is in force on the memory location. No thread may write to a memory location having a shared lease in force. A shared lease expires once its lease period elapses. Further, in one or more embodiments of the present invention, while a shared lease is in force on the memory location, an attempt to acquire an exclusive lease on the memory location fails.

In one or more embodiments of the present invention, when a shared lease is invoked on a memory location already having a shared lease, the shared lease on the memory location has a lease period equal to the greater of the lease periods specified in the initial shared lease operation and the subsequent shared lease operation.

In one or more embodiments of the present invention, a Load&Lease-Shared instruction may be used in a transaction, which is a set of operations involving a plurality of memory locations. In a transaction, any time after an initial Load&Lease operation is performed on a memory location (thereby making that location the "gating" location in a transaction implemented with exclusive-gated instructions), a Load&Lease-Shared operation may be performed to read any memory location that is not intended to be written. With reference to the exemplary transaction shown below, a Load&Lease operation is performed on a first memory location a of the transaction with lease period t (line 1). Assuming that the Load&Lease operation on memory location a is successful, one or more Load&Lease-Gated operations may be performed to lease memory locations b and d for lease period t, where memory location a is specified as the "gating" location (lines 2, 4).

```
1  Load & Lease (&a, t)           /* gating location */
2  Load & Lease-Gated (&b, t, &x) /* first writable location */
3  Load & Lease-Shared (&c, t)    /* first read-only location */
4  Load & Lease-Gated (&d, t, &x) /* second writable location */
5  Load & Lease-Shared (&e, t)    /* second read-only location */
6  Load & Lease (&x, t+)          /* commit point */
7  Store & Unlease (&b, <val0>)   /* write-back and unlease */
8  Store & Unlease (&d, <val1>)   /* write-back and unlease */
9  Store & Unlease (&a, <val2>)   /* write-back and unlease */
```

Further, one or more Load&Lease-Shared operations are performed to acquire shared leases on memory locations c and e for lease period t (lines 3, 5), thereby rendering memory locations c and e as read-only locations.

Once the transaction finishes its computations using the values read in lines 1-5 of the transaction, the transaction is ready to commit. The completion of the transaction is commenced by extending the exclusive lease on the "gating" location. Such extension of the exclusive lease on the "gating" location may be achieved by performing a Load&Lease operation on a memory location already leased by the same thread performing the Load&Lease operation. For example, referring again to the exemplary transaction shown above, a Load&Lease operation is performed on memory location a with a long lease period t+ (line 6), thus extending the exclusive lease on gating location a and thereby effectively extending the leases on gated locations b and d. If the exclusive lease on the gating location is successfully extended, this marks the "commit point" of the transaction.

At the commit point of the transaction, a series of Store& Unlease operations are performed on "gated" locations b and d with values val0 and val1, respectively (lines 7-8), thereby "explicitly" removing the exclusive leases (i.e., without regard to lease time) on memory locations b and d. Then, the transaction performs a Store&Unlease operation on the "gating" location a with value val2 (line 9), thereby explicitly removing the exclusive lease on memory location a and completing the transaction.

Further, although the lease period parameters in the exemplary transaction shown above are shown as being equal, in one or more other embodiments of the present invention, the lease period parameters of differing leases may not be equal. For example, it may be desirable to ensure that the lease periods of the shared leases in the exemplary transaction shown above are set to expire after a set lease period on the "gating" location. In other words, the lease period of a shared lease may be set to ensure that the shared lease does not expire before the commit point of the transaction. As shared leases are not dependent on the "gating" location, once the transaction has committed, the shared leases for that transaction eventually expire.

Further, in one or more embodiments of the present invention, in addition to the parameters for each of the instructions in the exemplary transaction shown above, one or more instructions may have a parameter associated with an identification of the owning transaction so as to tie related instructions to each other.

Further, in one or more embodiments of the present invention, a shared lease may be implemented with an exclusive-lease-pending bit that is associated with a state of the shared lease. Whenever an attempt by an exclusive lease operation (e.g., a Load&Lease operation or a Load&Lease-Gated operation) fails on a memory location having a shared lease in force, the exclusive-lease-pending bit is set for the shared lease. Subsequent shared lease operations (e.g., Load&Lease-Shared operations) on the memory location, which would otherwise succeed when the exclusive-lease-pending is not set, fail, at least until the shared lease expires. Such an implementation prevents a situation from occurring in which several threads "take turns" keeping at least one shared lease on the memory location indefinitely. Keeping a shared lease on a memory location indefinitely, perhaps forever, prevents a thread from ever acquiring an exclusive lease on the memory location, and thus, ensuring that a memory location is not shared continuously and indefinitely, via use of the exclusive-lease-pending bit, helps alleviate otherwise potentially adverse behavior.

FIG. 1 shows an exemplary flow process in accordance with an embodiment of the present invention. In FIG. 1, if an exclusive lease is attempted on shared memory location x ST100, then a particular bit associated with shared memory location x is set ST102. When a subsequent shared lease is attempted on shared memory location x ST104, if the bit associated with shared memory location x is set ST106, the subsequent shared lease attempt fails ST108. Otherwise, if the bit associated with shared memory location x is not set ST106, the subsequent shared lease attempt succeeds ST110. Once the pending shared lease(s) on shared memory location x expire, memory location x may be exclusively leased. As described above, by using such a bit, memory location x may be ensured against being shared continuously and indefinitely.

Further, in one or more embodiments of the present invention, it may be possible for a transaction to first request read-only access to a memory location by way of a shared lease operation and then require write access to the memory location. In such a situation, a shared lease may be "upgraded" to an exclusive lease if the memory location is not shared by a thread not owning the current transaction. "Upgrading" a shared lease on a memory location may be achieved by performing an exclusive lease operation (e.g., Load&Lease-Gated operation) on the memory location given that, as describe above, the memory location is not shared by a thread not owning the current transaction.

Further, in one or more embodiments of the present invention, it may be possible to extend a transaction having a shared lease by extending a lease period of the shared lease in case, for example, where an initial shared lease period was insufficient for reaching the commit point of the transaction. Extending a lease period of a shared lease on a memory location may be achieved by performing a subsequent shared lease operation (e.g., Load&Lease-Shared operation) on the memory location. Further, as described in U.S. patent application Ser. No. 11/078,120, entitled "Exclusive Lease Instruction Support for Transient Blocking Synchronization," a transaction may be extended at its commit point by extending the exclusive lease on the gating location.

Further, in one or more embodiments of the present invention, because support for shared lease in transient blocking synchronization allows multiple threads to have read access to a memory location at the same time, increased parallelism may be achieved.

Further, in one or more embodiments of the present invention, shared lease instruction support in transient blocking synchronization may provide a synchronization mechanism to correctly handle an uncommon case (i.e., writing) while still performing well in the common case (i.e., reading).

Further, in one or more embodiments of the present invention, shared leases may be implemented such that a memory location is not "forever" shared by multiple threads, thereby preventing a situation in which exclusive access to the memory location may never be obtained.

Further, in one or more embodiments of the present invention, a shared lease on a memory location may subsequently be changed to an exclusive lease, thereby allowing an owning transaction write access to the memory location.

Further, in one or more embodiments of the present invention, a shared lease on a memory location in a transaction may be implemented such that a lease period of the shared lease may be extended.

Further, in one or more embodiments of the present invention, because a shared lease on a memory location expires on its own, a complementary operation to unlease the memory location may not be required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing computer system operations, comprising:
    obtaining a shared lease to a first memory location in a shared memory, wherein the shared lease is for a first predetermined period of time, and wherein an exclusive bit associated with the shared lease is not set;
    extending the shared lease to the first memory location for a second predetermined amount of time;
    setting the exclusive bit responsive to an attempt to obtain an exclusive lease to the first memory location, wherein the attempt is made within the second predetermined period of time;
    denying the attempt to obtain the exclusive lease;
    attempting to extend the shared lease to the first memory location, wherein the attempt is made within the second predetermined period of time;
    denying the attempt to extend the shared lease when the exclusive bit associated with the shared lease is set; and
    releasing the shared lease after the second predetermined amount of time.

2. A shared-memory multiprocessor computer system having instructions for synchronizing operations on memory, the instructions comprising instructions to:
    obtain a shared lease to a first memory location in a shared memory, wherein the shared lease is for a first predetermined period of time, and wherein an exclusive bit associated with the shared lease is not set;
    extend the shared lease to the first memory location for a second predetermined amount of time;
    set the exclusive bit responsive to an attempt to obtain an exclusive lease to the first memory location, wherein the attempt is made within the second predetermined period of time;
    deny the attempt to obtain the exclusive lease;
    attempt to extend the shared lease to the first memory location, wherein the attempt is made within the second predetermined period of time;
    deny the attempt to extend the shared lease when the exclusive bit associated with the shared lease is set; and
    release the shared lease after the second predetermined amount of time.

3. A computer system, comprising:
    at least one processor;
    a shared memory operatively connected to the at least one processor and comprising at least a first memory location and a second memory location shared by a plurality of processes; and
    a controller configured to:
        obtain a shared lease to the first memory location for a first predetermined period of time,
            wherein a first value in the first memory location is used to calculate a second value,
            wherein the second value is stored in the second memory location, and
            wherein an exclusive bit associated with the shared lease is not set;
        extend the shared lease to the first memory location for a second predetermined amount of time;
        set the exclusive bit responsive to an attempt to obtain an exclusive lease to the first memory location, wherein the attempt is made within the second predetermined period of time;
        deny the attempt to obtain the exclusive lease;
        attempt to extend the shared lease to the first memory location, wherein the attempt is made within the second predetermined period of time;
        deny the attempt to extend the shared lease when the exclusive bit associated with the shared lease is set; and
        release the shared lease after the second predetermined amount of time.

* * * * *